Feb. 18, 1941. H. W. KELLY 2,231,920
POWER TRANSMISSION BELT
Filed Sept. 9, 1939
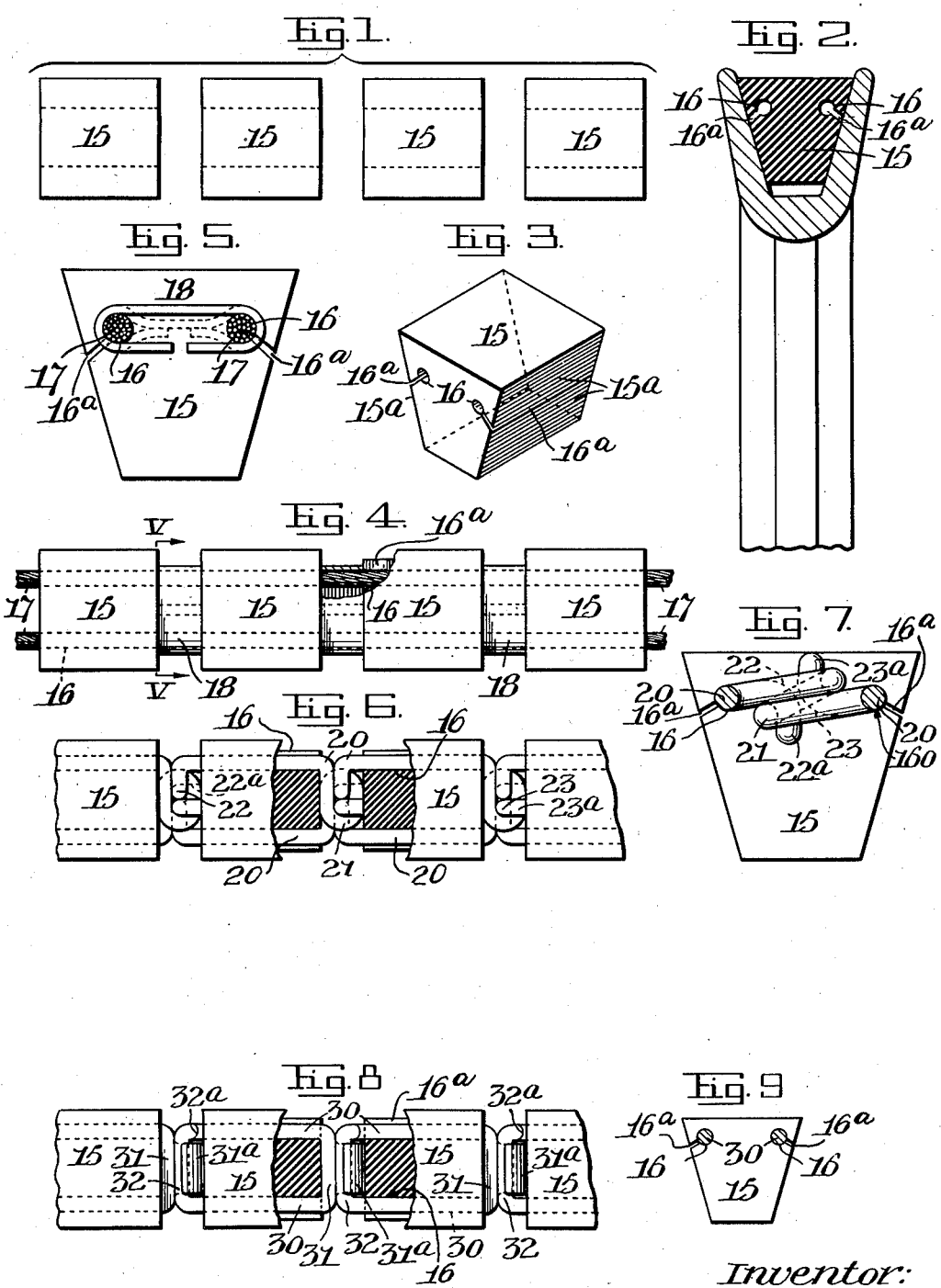
Inventor:
Hugh Williamson Kelly,
by Murray C. Boyer
Atty.

Patented Feb. 18, 1941

2,231,920

UNITED STATES PATENT OFFICE 2,231,920

POWER TRANSMISSION BELT

Hugh Williamson Kelly, Woodbridge, N. J.

Application September 9, 1939, Serial No. 294,162

5 Claims. (Cl. 74—236)

My invention relates to power transmission belts and the object of my invention is to provide an improved type of V-shape belts.

My invention comprises a type of belt in which blocks or sections of friction material, substantially V-shape in cross section, are carried by or connected to suitable supporting means which may be in the form of an endless chain of links or the like; such V-shaped blocks being adapted for frictional engagement with the walls of pulley grooves.

Many forms of V-shape belts have been proposed, and a common type is built of short sections of leather which are set in place in overlapping relation and angular disposal. One difficulty residing in the use of belts of this type is their tendency to stretch; greatly diminishing their efficiency.

A factor in favor of belts of this type is the desirability of employing rubber, rubber compounds, and other gums for the friction blocks. Since balata and rubber, either separately or together, are known to provide the maximum friction for belting of the power transmission type, I propose an improvement in previous and present methods of providing such facilities. At the same time my improved type of belt reduces the amount and therefore the cost of rubber or other forms of the friction elements, and simplifies the assembly of such elements into various sizes of V-belting.

In carrying out my invention I employ separate units of friction material of the character referred to or any material having similar characteristics, superposed upon and carried by various types of endless supports of a mechanical nature which, or with means associated therewith, serve to properly space the units so as to afford the utmost friction. Multiples of separate integral units, molded or otherwise formed into V-shape, are inserted in specially designed metal or other mechanical carriers which afford a non-stretchable and non-shrinkable belt for power transmission. These separate units may be composed of rubber, rubber substitutes, or a combination thereof, together with balata, or a mixture of all of these materials. It will be understood of course that built-up units may be employed—laminated structures, for instance—in which the lamina, which may be of some suitable fabric, are thick or thin as desired and are connected into a solid body of friction material by the use of any gum, resin, or the like, natural or synthetic.

Specifically, my invention resides in employing separate integral blocks of V-shape of suitable friction material, and detachably mounting them in small supporting frames which may be linked together to form an endless band or belt; the frames being so attached to the blocks as to insure that the lateral beveled surfaces of the same shall offer no obstruction to proper engagement with the beveled walls of the pulley grooves. The blocks may be carried by links of the well-known "link-belt" type; they may be supported in various forms of frames encircling or otherwise applied to the separate blocks, and the blocks have openings longitudinally of the same and communicating slots for the reception of portions of such frames, or ropes, cords, or the like; such supports providing the desired flexibility.

In all forms of the frame supports, they have pivotal connections and these connections serve to maintain the blocks in the separated and desired spaced relation. If cords or ropes, preferably of wire, are employed as the carriers for the friction blocks, it is desirable to mount individual spacers upon the same between the several blocks in order that they may be maintained in the desired position lengthwise of the belt.

These and other features of my invention are more fully described hereinafter; reference being had to the accompanying drawings, more or less diagrammatic in character, in which:

Figure 1 represents in plan view a series of unit elements or blocks of V-shape as they may be cut from a molded or otherwise prepared section of friction material.

Fig. 2 illustrates the manner in which a V-belt fits the groove of a pulley wheel or sheave.

Fig. 3 is a perspective view of a V-block unit having the general contour or shape which I prefer.

Fig. 4 is a fragmentary portion of one form of belt within the scope of my invention carrying unit friction blocks of V-shape in spaced relation.

Fig. 5 is a sectional view, on a larger scale, taken on the line V—V, Fig. 4, and Figs. 6, 7, 8, and 9 show various forms of flexible supports or connecting means, frames or the like, whereby I can develop power transmission belts within the scope of my invention with the use of unit friction blocks of V-shape.

The material from which the blocks of V-shape are cut may be molded or otherwise prepared and, when fabric is employed, in the form of lamina or otherwise, it will be built up in any manner usual in the art. If any form of rubber, rubber compound, with or without balata, or similar or other gums, such material or compound will be vulcanized or cured in any well known manner to provide a material having the desired friction qualities.

For the purpose of utilizing the unit blocks with the various forms of supporting frames, or the like, in the production of transmission belts, the openings, recesses, grooves, slots or the like for proper cooperation with the supports will be initially formed in the strip or other element from which the unit blocks are cut.

The unit friction blocks of V-shape are indicated at 15, and in the form of power transmission belt illustrated in Figs. 4 and 5, they are provided with apertures or openings 16, lengthwise of the same, which are preferably circular, as clearly indicated in Fig. 2, and narrow slots 16a, which may be inclined in the manner shown, are cut in the sides of the blocks and communicate with the longitudinal openings 16. These apertures or openings are above the central plane of the blocks and in the region of their greatest width. A series of these friction blocks are mounted or strung upon flexible ropes or cords 17, of wire or other material which parallel each other and lie in the same plane, in the manner indicated, in definite spaced relation, and belts of any length may be built in this manner; the ends of the respective ropes or cords being subsequently connected together in any usual or well known manner after the desired number of blocks have been mounted thereon. In order that the friction blocks may be maintained in the desired spaced relation spacers, in the form of clips 18 and which may be of metal, may be clasped around the ropes or cords in the manner illustrated in Fig. 5 and, if desired, these clips may be compressed into the shape indicated by dotted lines. The presence of these spacing clips, embracing the ropes or cords, provide with the latter substantially rectangular frames for the reception of the blocks which are applied by pressing the ropes or cords through the slots 16a at the sides of the blocks until they occupy the longitudinal openings 16 in the same and finally lie in the same plane and above the central plane of the blocks. The faces 15a of the friction blocks are entirely smooth above and below the slots 16a and in the same plane and they will have the same bevel as the walls of the groove of the pulley wheel or sheave to provide the desired frictional contact therewith. In all instances the blocks will be sufficiently resilient to provide the desired friction.

In the form of belt illustrated in Figs. 6 and 7, I have provided small frames of wires twisted into the desired contour or shape to provide central openings for the reception of the V-blocks, and end connections providing hinges to give the complete belt the desired flexibility. These wire frames may comprise side portions 20 in parallel relation, with the bight of the same twisted to provide an elongated "eye" 21, which may lie in the position indicated in Fig. 6. This eye will receive the free ends of the next adjacent wire frame of an exactly similar character; one of such ends, 22, being bent downwardly and then substantially at right angles to lie longitudinally of the belt, as indicated at 22a, and the other, 23, being bent upwardly and then substantially at right angles to lie longitudinally of the belt, as indicated at 23a; such connection forming a hinge joint. The bends of the wire frames making up these hinge joints, including the "eye" portion thereof will lie between pairs of the V-blocks and function as spacing means for the same. In this form of my improved belt structure, as in the construction illustrated in Figs. 4 and 5, the integral V-blocks are provided with the longitudinal openings 16 in the same plane which accommodate the side portions 20 of the wire frames; the narrow communicating slots 16a affording an entrance to such openings when setting the V-blocks in place within the frames. The through openings 16 are so disposed with respect to the sides of the V-blocks that the side portions 20 of the wire frames will lie a sufficient distance inwardly of the beveled faces thereof to avoid any obstruction to proper frictional engagement of such surfaces with the walls of the pulley grooves.

In the form of belt illustrated in Figs. 8 and 9, I utilize links of the ordinary "link-belt" type, which have central openings for the reception of the V-blocks. These links are usually of cast metal or drop forgings and present side portions 30 and end portions 31 and 32; the end portion 31 having a hook 31a and the end portion 32 having a relatively circular cross-sectional contour for engagement thereby whereby such links are arranged in hinged relation. As is well known, these links are constructed for ready assembly and disassembly by providing a narrow throat at one corner, as indicated at 32a, so that by proper disposal of a pair of links with respect to each other, they may be connected together in the desired relation, or disconnected, as may be desired. In utilizing a chain or link belt of this character, the V-blocks will have the same sort of longitudinal openings 16, with narrow communicating slots 16a, as in the other forms of belt structures illustrated, and the parallel side portions 30 of the frames provided by the separate links, will occupy the same relative positions in said longitudinal openings as the side portions 20 of the wire frames illustrated in Figs. 6 and 7. The hinged connections between the end walls of the respective V-blocks provide the desired spacing means; maintaining the V-blocks in proper relative position at all times.

The point of connection between the carrier frames, links, and/or the like, and the insertible and removable friction blocks may, in usual cases, be made at any point most convenient of application although it is preferable that such connection be made at such point as to secure the desired equilibrium of the finished structure in its operative position and this will be found above the central plane thereof and in the region of greatest width of the friction blocks and near the upper portion or top of the same.

By the use of individual link or frame supports, such as illustrated in Figs. 6–9, I am enabled to provide a belt structure possessing all of the advantages of any V-belt, plus the further and very great advantages of being non-stretchable and non-shrinking, and completely flexible. By reason of the character of the supporting frames or the links and the manner of connecting the same, belts of any length may be provided, and, by changing the size of such supports, suitably sized friction blocks of V-form may be accommodated therein. Additionally, if for any reason repairs are necessary, the belt may be separated at any point and new elements placed therein; easily and quickly.

It is within the scope of my invention to apply metal wear plates adjacent to the end walls or faces of the respective V-blocks to prevent the spacing means cutting into the body of the same; such plates being of a dimension to lie wholly within such surface and spaced from the edges of such end faces or walls so as to avoid any contact with the walls of the pulley grooves.

While I have described and shown with more or less particularity certain details of construction embodying my invention, it will be understood that such disclosure is illustrative only and not in any limiting sense and that modifications may be made therein without departing from the spirit of my invention, all of which is deemed to be within the scope of the appended claims.

I claim:

1. A power transmission belt comprising endless carrier means including a plurality of side supports in parallel relation and in the same plane, a plurality of integral V-shaped friction blocks having a rectangular contour in plan detachably mounted in said carrier means; said blocks having longitudinal openings above the central plane thereof in the region of their greatest width in which the uniplanar side supports may be embedded with narrow slots at the sides of the blocks communicating with said longitudinal openings and permitting insertion of said supports, and means associated with the endless carrier means for maintaining said blocks in spaced relation.

2. A power transmission belt comprising a series of metal frames including parallel side portions, pivotal connections sustaining said frames in endless formation and in the same plane; each of said frames presenting a substantially rectangular central opening, and V-shaped friction blocks having a rectangular contour in plan detachably mounted in the central openings of said frames; said blocks having longitudinal openings above the central plane thereof in the region of their greatest width in which side portions of the metal frames may be embedded with narrow slots in the sides of the blocks communicating with said longitudinal openings and permitting insertion of said side frame portions.

3. A power transmission belt comprising a series of chain links pivotally connected in endless formation so that the said links lie in the same plane; each of said links presenting a central opening, and V-shaped friction blocks having a rectangular contour in plan detachably mounted in the central openings of said links; said blocks having longitudinal openings above the central plane thereof in the region of their greatest width in which portions of the links may be embedded below the engaging surfaces of the blocks with narrow slots in the sides of the blocks communicating with said longitudinal openings and being maintained in spaced relation by the pivotal connections of the links.

4. A power transmission belt comprising a series of open chain links of rectangular form and pivotally connected in endless formation so that said links lie in the same plane; each of said links presenting a central opening, V-shaped friction blocks having a rectangular contour in plan detachably mounted in the openings of said links; said blocks having longitudinal openings above the central plane thereof in the region of their greatest width in which portions of the chain links may be embedded with narrow slots at the sides of the blocks communicating with said longitudinal openings, and means associated with said links for maintaining the friction blocks in spaced relation.

5. A power transmission belt comprising an endless carrier element made up of a plurality of flexibly connected substantially rectangular frames lying in the same plane and providing spacing means, and integral V-blocks of homogeneous friction material having a rectangular contour in plan detachably supported in said frames at a point affording the greatest equilibrium of the finished structure in its operative position; said blocks having longitudinal openings above the central plane thereof in the region of their greatest width in which the side portions of said frames may be embedded with narrow slots at the sides of the blocks communicating with said longitudinal openings.

HUGH WILLIAMSON KELLY.